US010487869B2

(12) United States Patent
Beale (10) Patent No.: US 10,487,869 B2
(45) Date of Patent: Nov. 26, 2019

(54) COMPOSITE STRUCTURAL COMPONENT WITH TENSION/COMPRESSION MECHANICAL JOINT

(71) Applicant: Crompton Technology Group Limited, West Midlands (GB)

(72) Inventor: Tom Beale, Faringdon (GB)

(73) Assignee: CROMPTON TECHNOLOGY GROUP LIMITED, West Midlands (GB)

( * ) Notice: Subject to any disclaimer, the term of this patent is extended or adjusted under 35 U.S.C. 154(b) by 0 days.

(21) Appl. No.: 15/909,028

(22) Filed: Mar. 1, 2018

(65) Prior Publication Data
US 2018/0282992 A1 Oct. 4, 2018

(30) Foreign Application Priority Data
Mar. 31, 2017 (EP) .................................... 17164437

(51) Int. Cl.
*F16C 7/02* (2006.01)
*F16C 3/02* (2006.01)
(Continued)

(52) U.S. Cl.
CPC ............ *F16C 7/026* (2013.01); *B62D 29/048* (2013.01); *F16C 3/026* (2013.01); *B64C 2001/0072* (2013.01); *F16C 2240/30* (2013.01)

(58) Field of Classification Search
CPC ......... E04B 1/185; E04B 1/30; B62D 29/048; B64C 1/06; B64C 2001/0072; F16C 3/026; F16C 7/026; F16C 2240/30
See application file for complete search history.

(56) References Cited

U.S. PATENT DOCUMENTS 3,698,264 A 10/1972 York
4,183,261 A * 1/1980 Eiselbrecher ......... B29C 53/564
74/579 R
(Continued)

FOREIGN PATENT DOCUMENTS

DE 202010006303 U1 8/2010
EP 0032051 A3 7/1981
(Continued)

OTHER PUBLICATIONS

Extended European Search Report for International Application No. 17164437.0 dated Sep. 15, 2017, 7 pages.

*Primary Examiner* — Adam D Rogers
(74) *Attorney, Agent, or Firm* — Cantor Colburn LLP (57) ABSTRACT

A composite structural component includes an elongate member made of a polymer matrix composite material. The elongate member generally extending along an axis of the composite structural component from an end portion thereof. The component also includes an end fitting forming a mechanical joint with the end portion. The elongate member includes a first member extending from the end portion along the axis of the composite structural component and a second member extending from the end portion along the axis of the composite structural component. The end fitting is constrained in the end portion by the first and second members such that the first member is preloaded with a compressive stress in the axial direction and the second member is preloaded with a tensile stress in the axial direction.

12 Claims, 5 Drawing Sheets

(51) Int. Cl.
*B62D 29/04* (2006.01)
*B64C 1/00* (2006.01)

(56) References Cited

U.S. PATENT DOCUMENTS

| | | | | |
|---|---|---|---|---|
| 4,275,122 A | * | 6/1981 | Fisher | B29C 66/534 |
| | | | | 285/423 |
| 4,300,410 A | * | 11/1981 | Raghupathi | B29C 53/564 |
| | | | | 156/172 |
| 4,411,114 A | * | 10/1983 | Wurtinger | F16C 7/026 |
| | | | | 403/267 |
| 4,552,035 A | * | 11/1985 | Skipper | F16C 7/026 |
| | | | | 59/84 |
| 4,704,918 A | * | 11/1987 | Orkin | D04C 3/48 |
| | | | | 403/224 |
| 4,863,416 A | * | 9/1989 | Gupta | B29C 53/58 |
| | | | | 464/181 |
| 5,288,109 A | * | 2/1994 | Auberon | F16L 47/00 |
| | | | | 138/109 |
| 5,683,300 A | * | 11/1997 | Yasui | F16C 3/026 |
| | | | | 242/447.1 |
| 6,190,263 B1 | * | 2/2001 | Kimoto | F16C 3/026 |
| | | | | 464/181 |
| 6,324,940 B1 | * | 12/2001 | Pazdirek | B29C 53/585 |
| | | | | 174/47 |
| 6,682,436 B2 | * | 1/2004 | Kimoto | F16C 3/026 |
| | | | | 464/181 |
| 7,597,953 B2 | * | 10/2009 | Filsinger | B29C 70/222 |
| | | | | 428/292.1 |
| 8,667,754 B2 | * | 3/2014 | Schalla | B29C 70/222 |
| | | | | 52/362 |
| 9,157,470 B2 | | 10/2015 | Uhl | |
| 2011/0033225 A1 | * | 2/2011 | Buchin | F16C 7/026 |
| | | | | 403/119 |
| 2017/0198734 A1 | * | 7/2017 | Bernard | F16C 7/026 |
| 2018/0283424 A1 | * | 10/2018 | Beale | E04C 3/28 |

FOREIGN PATENT DOCUMENTS

| | | | | |
|---|---|---|---|---|
| EP | 0222660 A1 | * | 5/1987 | ........... B29C 53/582 |
| EP | 0668446 A1 | | 8/1995 | |
| EP | 0032051 A2 | | 7/2015 | |
| FR | 2942161 A1 | * | 8/2010 | ............ B29C 70/72 |
| GB | 1552298 A | | 9/1979 | |
| JP | 2008307842 A | | 12/2008 | |
| WO | 0177771 A1 | | 10/2001 | |

\* cited by examiner

COMPOSITE STRUCTURAL COMPONENT WITH TENSION/COMPRESSION MECHANICAL JOINT

FOREIGN PRIORITY

This application claims priority to European Patent Application No. 17164437.0 filed Mar. 31, 2017, the entire contents of which is incorporated herein by reference.

TECHNICAL FIELD

The present disclosure relates to mechanical joints for composites, in particular mechanical joints for composite structural components made of a polymer matrix composite material. This disclosure is concerned with tension/compression mechanical joints that can transmit axial loads to/from a composite structural component.

BACKGROUND

Composite structural components are typically made of a polymer matrix composite material, often a fibre-reinforced polymer matrix composite material using glass and/or carbon fibre reinforcement, e.g. carbon fibre reinforced polymer (CFRP). Composite structural components offer the opportunity for lightweight and cost effective load transmission solutions. The largest benefits are often achieved when the load path and geometry are simple. Axial load transmission components, for example beams, rods, tubes and struts, are ideal candidates for polymer matrix composite material and such composite structural components are increasingly being used on commercial aircraft in addition to automotive and construction industries. These composite structural components generally require an end fitting having a complex form to interface with other components. Metals are efficient in terms of weight and cost for forming an end fitting having a complex geometry. However, joining a composite structural component to a metallic end fitting poses significant challenges, especially in the aerospace industry where the joint must be formed in a robust and certifiable manner.

Joining an end fitting to a composite structural component requires a reliable mechanism to transfer axial loads into the composite structural component. A mechanical joint may be preferred at least for aerospace certification purposes. However mechanical joints can often suffer from the problem of fretting and wear due to relative movement between the metal end fitting and the relatively soft material of the composite structural component. Sophisticated manufacturing capability may also be required to make a suitable mechanical joint.

The present disclosure seeks to provide a mechanical joint for a composite structural component which may not experience wear and damage from fretting. The present disclosure also seeks to provide a mechanical joint for a composite structural component which may have an increased strength to weight ratio and an increased strength to cost ratio.

SUMMARY

According to the present disclosure there is provided a composite structural component comprising: an elongate member made of a polymer matrix composite material, the elongate member generally extending along an axis of the composite structural component from an end portion of thereof; and an end fitting forming a mechanical joint with the end portion; wherein the elongate member comprises: a first member extending from the end portion along the axis of the composite structural component; a second member extending from the end portion along the axis of the composite structural component; and wherein the end fitting is constrained in the end portion by the first and second members such that the first member is preloaded with a compressive stress in the axial direction and the second member is preloaded with a tensile stress in the axial direction.

In such a tension/compression mechanical joint, an end fitting is held mechanically constrained by a twin-member composite structural component. Before the mechanical joint is subjected to an axial tension/compression load during use, the first and second members are preloaded with compressive/tensile stress in the axial direction of the composite structural component. This means that the polymer matrix composite material of the first and second members experiences a compressive/tensile stress rather than being in an unstressed natural state. This preloading keeps the first and second members in contact with the end fitting during service, regardless of whether the joint is loaded in tension or in compression.

It is an advantage of the present disclosure that the mechanical joint does not require any form of bonding (e.g. adhesive), nor a frictional engagement, nor a complex mechanical form for the end fitting in order to deliver load to the composite structural component. Sophisticated manufacturing capability is not required to manufacture the key components of the mechanical joint. Because the first and second members are preloaded in compression and tension, respectively, the net axial stress in the composite structural component is lowered when an axial load is transmitted by the end fitting, resulting in a very high strength to weight ratio for the joint. Significant mass savings can be made compared to a conventional single-member composite structural component.

During service, an axial load is delivered to the end portion of the composite structural component by the constrained end fitting in the mechanical joint. The end fitting may be constrained in the end portion by the first and second members in a variety of different ways. In various examples the second member comprises a surface, in contact with the end fitting, that extends at an angle to the axis. In various examples, in addition or alternatively, the first member comprises an end face in contact with the end fitting. This means that a tensile axial load applied to the end fitting will act on the second member in the end portion, while a compressive axial load applied to the end fitting will act on the first member in the end portion. Accordingly the first member may be called a compression member and the second member may be called a tension member.

Another advantage of a twin-member composite structural component is that the mechanical joint can be tailored to the expected loading during service. For example, a composite structural component designed for a significant compression load in use may have the second (tension) member made thinner/smaller, or less stiff, e.g. by changing the volume ratio between reinforcing fibre and polymer matrix and/or by changing the type of reinforcing fibre. Conversely, a composite structural component designed for a significant tension load in use may have the first (compression) member made thinner/smaller, or less stiff. For example, the second (tension) member made more stiff, e.g. reinforced with intermediate modulus (IM), high modulus (HM) or ultra high modulus (UHM) carbon fibres, and the first (compression) member made less stiff, e.g. reinforced with standard modulus (such as AS4) or IM carbon fibres, or glass fibres. More generally, one of the first and second members may be made of polymer matrix composite material comprising fibres having a higher (or lower) elastic modulus than in the composite material of the other member. The stiffness of each member is determined by its geometry and elastic modulus of the reinforcing fibre. Depending on the application, the size requirements for each load case allows tuning of the twin-member geometry for mass reduction.

As a result of the first member being preloaded with a compressive stress in the axial direction, and the second member being preloaded with a tensile stress in the axial direction, relative movement between the end fitting and the composite structural component can be avoided when a load is applied to the joint. This minimises the risk of fretting wear or damage, especially under cyclic loading. Fretting is often a problem when connecting a metal end fitting to a composite structural component. In various examples the end fitting is a metal component. The end fitting may be any suitable mechanical fastener, for example a rod end, a clevis, a socket. A mechanical fastener such as a clevis may include an eye fitment. The end fitting may itself contain a second assembly, depending on the application (i.e. custom fit for adjustability). The end fitting may include a thread for screw attachment, or a bayonet fitting, for attaching the joint to another component.

It is desirable for the polymer matrix composite material of the first member to be optimised to withstand compression during service. In various examples the first member is axisymmetric. For example, the first member may be substantially cylindrical e.g. a tubular member. The first member may take the form of a hollow tube or beam. When preferably forming the first member in a filament winding process, continuous fibre may be used that is not in the axial direction i.e hoop/high angle helical fibres can be wound as well—this dramatically increases the compressive axial strength to weight ratio, preventing micro-buckling on the (near) axially aligned fibres. Accordingly the first member may be a filament wound structure comprising multiple layers wound at different angles, for example one or more layers of low angle fibre (for example fibre wrapped at 8-20°) and one or more layers of high angle fibre (for example fibre wrapped at 70-89°).

As mentioned above, the first member may comprise an end face in contact with the end fitting. In examples wherein the first member is substantially cylindrical, there may be defined a circumferential end face in a plane perpendicular to the axis. The end face may extend 360° around an open end of the first member. The Applicant has recognised that it is desirable to prevent end face crush/delamination when loading the end face in compression. In various examples, in addition or alternatively, the first member may further comprise an outer annular component arranged in contact with an outer surface so as to circumscribe the first member at the end face. The outer annular component, e.g. hoop ring, may be made of a stiffer material than the composite material of the first member. The outer annular component is preferably a metal ring. This annular component can ensure that delamination of the composite material does not occur at the exposed end face.

In addition, or alternatively, the component may further comprise a rubber or elastomeric member arranged in contact with the end face of the first (compression) member. The rubber or elastomeric member may be arranged between the first member and the end fitting, to absorb tolerances and avoid separation, thereby preventing fretting in cyclic loading and failure at the end face.

As mentioned above, the second member may comprise a surface, in contact with the end fitting, that extends at an angle to the axis. In a first set of examples the second (tension) member has a three-dimensional shape in the end portion that extends in more than one direction that is perpendicular to the axis. In one set of examples the second member may wholly surround the first member in a circumferential direction (i.e. around the axis of the composite structural component). For example, the second member may comprise an axisymmetric dome in the end portion. The second member may comprise an axisymmetric structure such as a cylinder away from the end portion. This can facilitate manufacture of the twin-member structure using a filament winding process. The end fitting may also be domed so as to be constrained inside the axisymmetric dome of the second member. In these examples the second (tension) member may be filament wound directly onto the end fitting and the preloaded first (compression) member. After curing the composite structural component, the preload on the first member can be relieved such that a tensile stress is applied to preload the second member. Such a manufacturing process is described further below.

It is desirable for the polymer matrix composite material of the second member to be optimised to withstand tension during service. The second member may be a filament wound structure comprising one or more layers of glass or carbon fibre at low angles e.g. 8-15° to the axis. Even in examples where the second member comprises an axisymmetric dome in the end portion, the domed shape may be formed from mainly low angle fibres. However, using a standard filament winding process to form the second member it is not possible to achieve total axial alignment of the fibres. The Applicant has recognised that off-axis fibres are not required and fibres having an angle of 0° to the axis will result in the highest strength to weight ratio for the second (tension) member.

In a second set of examples the second (tension) member generally extends in one direction that is perpendicular to the axis. For example, the second member may comprise a tension band that wraps around the end fitting in a direction that is perpendicular to the axis. Optionally the tension band may form a continuous loop extending along the axis of the composite structural component and around an end fitting at each end of the composite structural component. In such examples the end fitting may comprise a groove in an outer surface that extends in a direction perpendicular to the axial direction. Optionally the end fitting may have an outer surface defined by an axisymmetric dome. The tension band may be received in the groove. This can facilitate with locating the tension band on the end fitting.

In one or more of these examples the tension band may comprise axially aligned fibres. The tension band may be formed from filament windings or a preformed tape with axial fibre reinforcement. Preferably the tension band is made of a polymer matrix composite material consisting of fibre reinforcement extending at an angle of 0-5° to the axis. In these examples the second (tension) member may be made using a non-standard filament winding process. Instead of rotating a mandrel around its longitudinal axis, the mandrel is rotated in a horizontal plane (e.g. about its axial mid-point) while fibres are fed through a horizontally traversing head. The first (compression) member may be made using a standard filament winding technique.

The first and second members may be arranged relative to one another in the composite structural component in a number of different ways. Preferably the second (tension) member extends from the end portion parallel to the first member along the axis. In some examples the second (tension) member may extend along the axis in contact with a surface of the first (compression) member. In other words, the first and second members may be touching. However there is no relative movement causing friction between the first and second members even when a load is applied to the composite structural component, due to the counteractive preloads. In other examples the second (tension) member may extend along the axis and be radially spaced from a surface of the first (compression) member. In various of these examples the first and second members may be coaxial. The first member may be inside or outside the second member, or vice versa.

In some preferred examples there is a radial spacing between the first and second members. For a composite structural component expected to experience higher tensile than compressive loads, the internal diameter of the second (tension) member may be significantly larger than the outer diameter of the first (compression) member. For a composite structural component expected to experience higher compressive than tensile loads, the internal diameter of the first (compression) member may be significantly larger than the outer diameter of the second (tension) member. This makes it possible to reduce the mass of the component by tailoring its structure to the expected strength required during service. In examples where there is a radial spacing between the first and second members, one or more radial supports may extend between the first and second members. In examples wherein the second member comprises a tension band, the radial supports may prevent vibrations of the band.

The composite structural component may comprise a mechanical joint as disclosed herein at one or both ends. Of course the other end of the component may be attached to an end fitting by a different mechanical joint. In various examples the composite structural component is substantially cylindrical. The elongate member is preferably tubular. An elongate member as disclosed herein may be a strut (e.g. designed to resist longitudinal compression) or a rod (e.g. designed to resist longitudinal tension). In some preferred examples the elongate member is a piston rod, e.g. a piston rod for a hydraulic or electric actuator. The elongate member may take the form of any axial load-bearing beam or tube. Although a composite structural coponent as disclosed herein is mainly intended to carry axial service loads, it is also envisaged that a bending moment may be applied to the composite structural component during service.

An elongate member as disclosed herein may be made of any suitable polymer matrix composite material. The polymer matrix composite material is preferably a fibre-reinforced polymer matrix composite material, e.g. comprising glass or carbon fibres. In many examples the polymer matrix composite material is carbon fibre reinforced polymer (CFRP). Such materials are inherently corrosion resistant and provide a large weight saving and improved fatigue performance.

The elongate member may be made using any suitable manufacturing technique. The first and second members may be made using the same, or different, composite manufacturing techniques. A fibre-reinforced polymer matrix composite material may be formed by braiding, automated fibre placement (AFP), prepreg wrap techniques or pultrusion methods. However in preferred examples the elongate member is a filament wound structure. Filament winding techniques are particularly well-suited for making composite members from carbon-fibre reinforced polymer (CFRP).

It will be understood that this disclosure mainly relates to a mechanical joint formed between an end fitting and an end portion of the elongate member in a composite structural component. Other portions of the composite structural component are not described in detail in this disclosure. The other portions of the composite structural component may optionally include one or more further components mounted internally or externally, for example an internal sleeve of metal or rubber, and/or hoop reinforcement (in the form of hoop-wound fibres or a separate ring made of composite or metallic material).

In at least some examples, the composite structural component comprises an elongate member generally extending along an axis from one end portion thereof to another end portion thereof. The composite structural component may comprise an end fitting forming a mechanical joint with either or each end portion. The same or different end fittings may be attached at either end of the component. The first and second members may extend along the length of the elongate member between the end portions. In addition, or alternatively, each end portion may comprise an open end of the elongate member, e.g. in examples wherein the elongate member is tubular.

According to the present disclosure there is further provided a method of forming a mechanical joint for a composite structural component comprising an elongate member made of a polymer matrix composite material, the elongate member generally extending along an axis from an end portion thereof, the method comprising: providing a first member of the elongate member; positioning an end fitting in contact with the first member in the end portion of the elongate member so as to preload the first member with a compressive stress in the axial direction; providing a second member of the elongate member in contact with the end fitting to form a mechanical joint with the end portion; positioning the end fitting so as to be constrained in the end portion by the first and second members and so as to preload the second member with a tensile stress in the axial direction.

Such a manufacturing method is unusual in that the end fitting is positioned in contact with the first and second members in such a way that the twin members are preloaded in tension/compression before any service loads are applied during use. When the component is loaded in tension, the preload will be reduced in the first (compression) member. When the component is loaded in compression, the preload will be reduced in the second (tension) member. The method may therefore involve preloading the compression/tension member to a required amount of axial displacement, such that this displacement will not be reduced to zero by an applied axial load. Accordingly the method may further comprise: setting the preload so as to exceed the expected axial loads for the component during service.

In various examples the first (compression) member is axisymmetric. Providing the first member may comprise winding reinforcing (e.g. carbon) fibres or filaments around a mandrel to form the first member.

In a first set of examples mentioned above, the second (tension) member has a three-dimensional shape in the end portion that extends in more than one direction that is perpendicular to the axis. For example, the second member may comprise an axisymmetric dome in the end portion. In such examples, providing the second member may comprise winding reinforcing (e.g. carbon) fibres or filaments around the end fitting. The first member may be filament wound and cured in a first manufacturing stage before forming the mechanical joint. After clamping the end fitting onto the first member in the end portion, the second member may be filament wound and cured in a second manufacturing stage. The end fitting may be adjusted to relieve the preload on the first member and apply a tensile stress to the second member. It will be appreciated that the first member remains preloaded with a compressive stress in the axial direction because it has been overwrapped by the second member.

In a second set of examples mentioned above, the second (tension) member generally extends in one direction that is perpendicular to the axial direction. For example, the second member may comprise a tension band that wraps around the end fitting in a direction that is perpendicular to the axis. In such examples, providing the second member may comprise applying a tension band around the end fitting. The first member may be filament wound and cured in a first manufacturing stage before forming the mechanical joint. The first member may be a pre-formed composite structural component made of a polymer matrix composite material, especially a fibre-reinforced polymer matrix composite material, e.g. carbon fibre reinforced polymer (CFRP). After clamping the end fitting onto the first member in the end portion, the tension band may be wrapped around the end fitting in a second manufacturing stage. This may be assisted by separating the end fitting into two or more parts while applying the tension band.

BRIEF DESCRIPTION OF THE DRAWINGS

One or more non-limiting examples will now be described, by way of example only, and with reference to the accompanying figures, in which.

DETAILED DESCRIPTION

There is seen in FIGS. 1A-1E a first example of a composite structural component 2. The composite structural component 2 comprises an end fitting 8 and an elongate member, which itself comprises a compression member 4 and a tension member 3, i.e. a "twin member". The tension member 3 comprises a hollow, filament wound CFRP cylinder portion along with a domed axisymmetric portion 10 in an end portion 5 of the elongate member 3,4. The end fitting 8 comprises a matching axisymmetric dome portion 6 which sits inside the domed end of the tension member 3 in the end portion 5 of the elongate member 3,4. The end fitting 8 may be a metal e.g. steel component. A further element of the end fitting 8, in this example a rod end, protrudes from the end portion 5 of the elongate member 3,4 in an axial direction, through an opening in the domed portion 10 of the tension member 3.

Figures 1A, 1B, 1C, 1D, 1E:
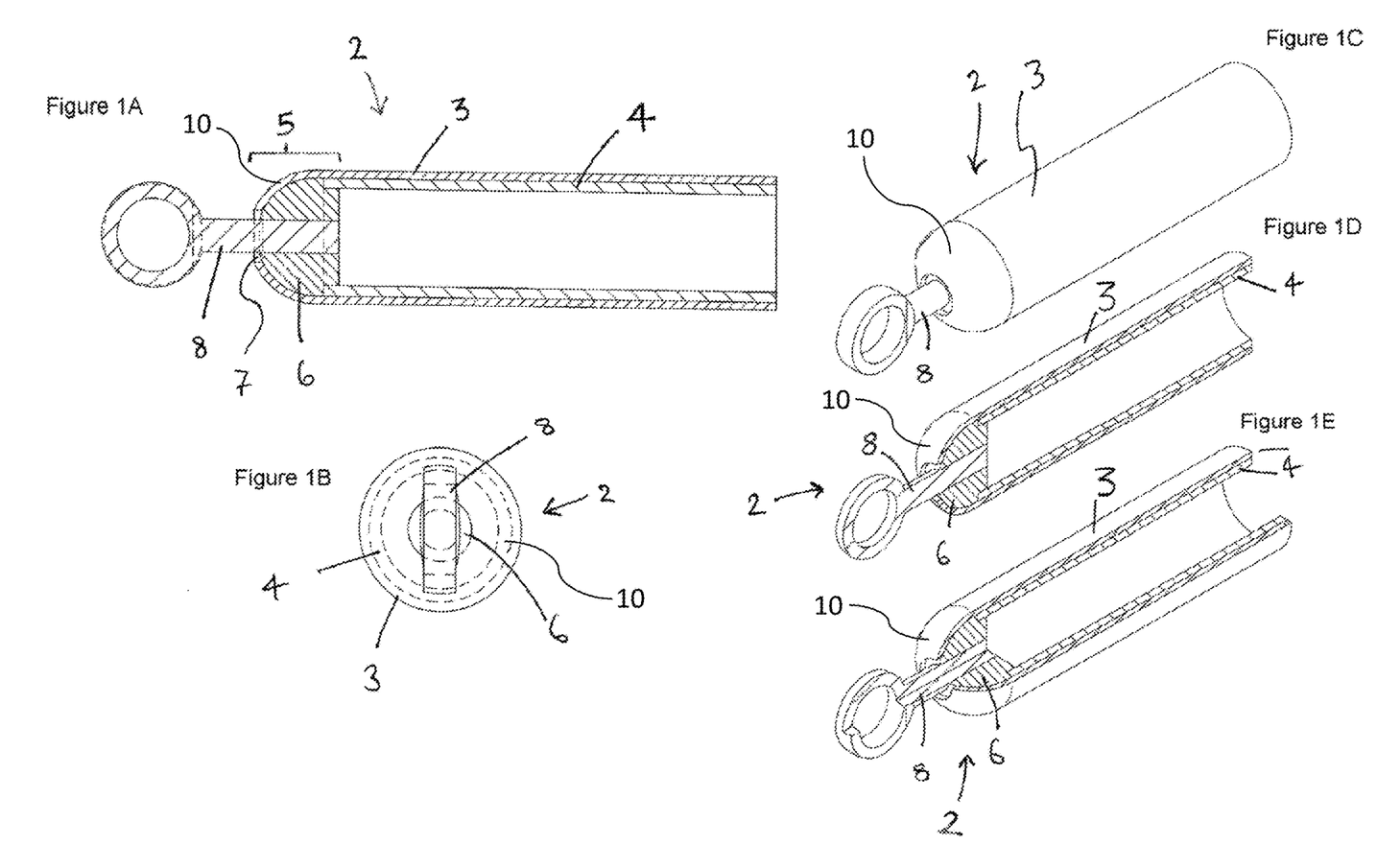
FIGS. 1A-1E show various partial views of a composite structural component according to a first example.
Figure 2A:
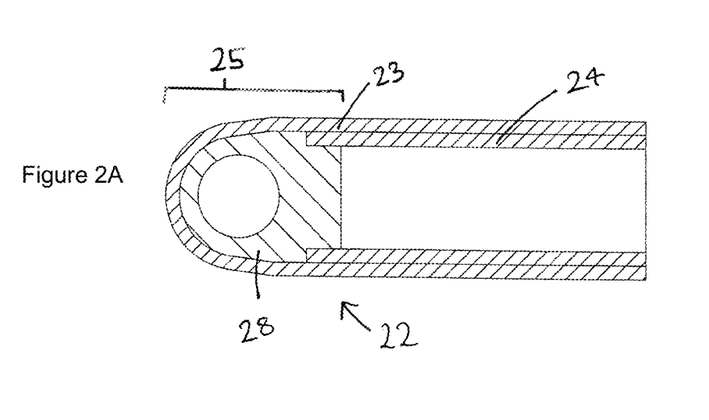
FIGS. 2A-2E show various partial views of a composite structural component according to a second example.
Figure 2B:
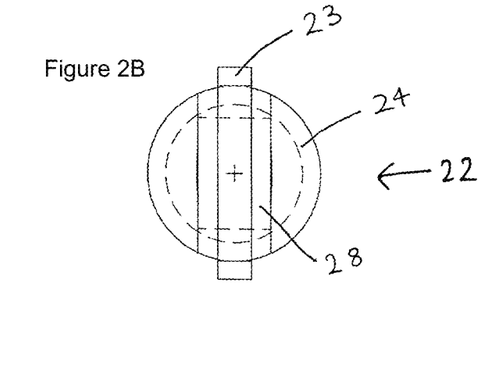
Figure 2C:
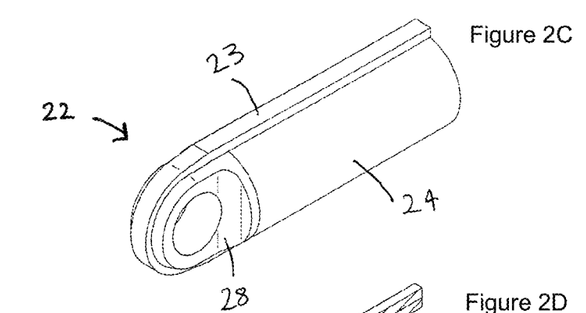
Figures 2D, 2E:
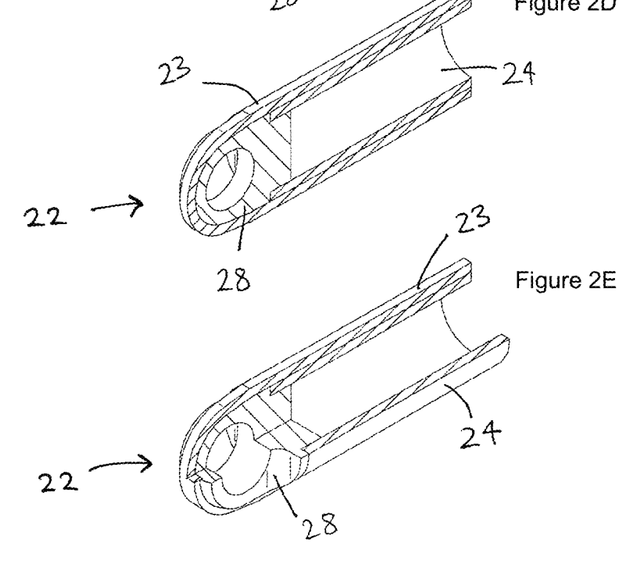

It can be seen, particularly from FIG. 1A, that the domed portion 10 at the end of the tension member 3 does not extend fully through 90°. There is a gap 7 between the end face of the domed portion of the tension member 3 and the end fitting 8. This ensures that the composite material of the tension member 3 does not come into contact with the surface of the metal end fitting 8, especially a threaded surface. It will be appreciated that the dome portion 6 may have a screw connection with the end fitting 8, which can assist in applying a preload stress.

The compression member 4 comprises a hollow, filament wound CFRP cylinder with an outer diameter equal to the inner diameter of the tension member 3. The compression member 4 is interior to the tension member 3 and is entirely enclosed by the tension member 3 and the end fitting 8, such that the dome portion 6 of the end fitting 8 is constrained between the tension member 3 and the compression member 4. This forms a mechanical joint between the end portion 5 of the elongate member 3,4 and the end fitting 8.

The inner end of the dome portion 6 of the end fitting 8 comprises a narrower cylindrical section with an outer diameter that matches the inner diameter of the compression member 4, and the compression member 4 is arranged such that the narrower section of the dome portion 6 of the end fitting 8 extends into the compression member 4. This prevents the compression member 4 and the end fitting 8 from moving relative to one another during manufacture and use. The dome portion 6 of the end fitting 8 is therefore in contact with an end face of the compression member 4.

During manufacture, the compression member 4 is preloaded with axial compressive stress, and the tension member 3 is preloaded with axial tensile stress. As a result, all of the components within the composite structural component 2 are held firmly in contact with one another such that they cannot move relative to one another during use, without the use of any adhesive (although this does not preclude the use of adhesives).

In use, the end fitting 8 delivers an axial load to the end portion 5 of the elongate member 3, 4, wherein a compressive load is resisted by the compression member 4 and a tensile load is resisted by the tension member 3. Whilst in this example the compression member 4 and the tension member 3 are illustrated as having substantially the same wall thickness, this, along with their stiffness, can be tuned in order to give the composite structural component 2 the tensile and/or compressive strength required for a particular application.

Although FIG. 1 only shows an end portion 5 at one end of the elongate member 3, 4, it will be appreciated that the composite structural component 2 may have the same structure at both ends, with an end fitting at either end or both ends.

There is seen in FIGS. 2A-2E a second example of a composite structural component 22. The composite structural component 22 comprises an end fitting 28 and an elongate member, which itself comprises a compression member 24 and a tension band 23. The end fitting 28 may be a metal e.g. steel component. The end fitting 28 comprises a first, outer end which has the shape of a solid axisymmetric dome with portions removed so as to form a cylindrical eyelet with longitudinal axis running perpendicular to the axis of symmetry of the dome, and two planar surfaces at the entrance and exit of the eyelet. The end fitting 28 further comprises a second, inner end, which has the shape of a cylinder aligned with the axis of symmetry of the dome, but has a smaller diameter than the outer diameter of the dome.

The compression member 24 comprises a hollow, filament wound CFRP cylinder with an internal diameter that matches the diameter of the cylinder portion of the end fitting 28. The compression member 24 is positioned such that the cylinder portion of the end fitting 28 extends into the end of the compression member 24 so that there is no relative movement of the compression member 24 and the end fitting 28 during manufacture or use.

The composite material (e.g. CFRP) tension band 23 runs along the edge of the compression member 24 in the longitudinal direction, around the curved end of the end fitting 28 and back along the opposite side of the compression member 24 again in the longitudinal direction. As a result the end fitting 28 is constrained between the compression member 24 and the tension band 23 and a mechanical joint is formed between an end portion 25 of the elongate member 23, 24 and the end fitting 28.

While the tubular compression member 24 may be formed using a standard filament winding process to include both low angle and high angle fibres, the tension member 23 is preferably formed from axially extending 0° fibres to maximise its tensile strength.

During manufacture, the compression member 24 is pre-loaded with axial (longitudinal) compressive stress, and the tension band 23 is preloaded with tensile stress. As a result all of the components within the composite structural component 22 are held firmly in contact with one another such that they cannot move relative to one another during use, without the use of any adhesive (although this does not preclude the use of adhesives).

In use, the end fitting 28 delivers an axial load to the end portion 25 of the elongate member 23, 24, wherein a compressive load is resisted by the compression member 24 and a tensile load is resisted by the tension band 23. In this example the tension band 23 has the same thickness as the wall of the compression member 24, but has a width that is significantly smaller than the circumference of the compression member 24. The thickness, width and stiffness of the tension band 23, and the thickness and stiffness of the compression member 24, can be adapted for each particular application to provide the composite structural component 22 with the tensile and/or compressive strength required.

Although FIG. 2 only shows an end portion 25 at one end of the elongate member 23, 24, it will be appreciated that the composite structural component 22 may have the same structure at both ends, with an end fitting at either end or both ends. In particular, the tension band 23 may form a continuous loop extending along the axis of the component 22 and around an end fitting 28 at each end of the component 22.

In FIGS. 3A-3D, another example of a composite structural component 32 is shown that comprises an elongate member and an end fitting 38. The end fitting 28 may be a metal e.g. steel component. The composite material (e.g. CFRP) elongate member comprises a tension band 33 and a compression member 34 and, similarly to other examples, a mechanical joint is formed between an end portion 35 of the elongate member and the end fitting 38 due to the tension band 33 and compression member 34 being in tension and compression, respectively. In this example, the diameter of the compression member 34 is smaller than that of the end fitting 38 such that tension band 33 is never in contact with the compression member 34. The end fitting 38 has a different shape to accommodate the radial spacing between the compression member 34 and the tension band 33. The smaller diameter of the compression member 34 may reduce the weight of the composite structural component 32 in applications for which a lower degree of compressive strength is required.

Figures 4A, 4B, 4C:
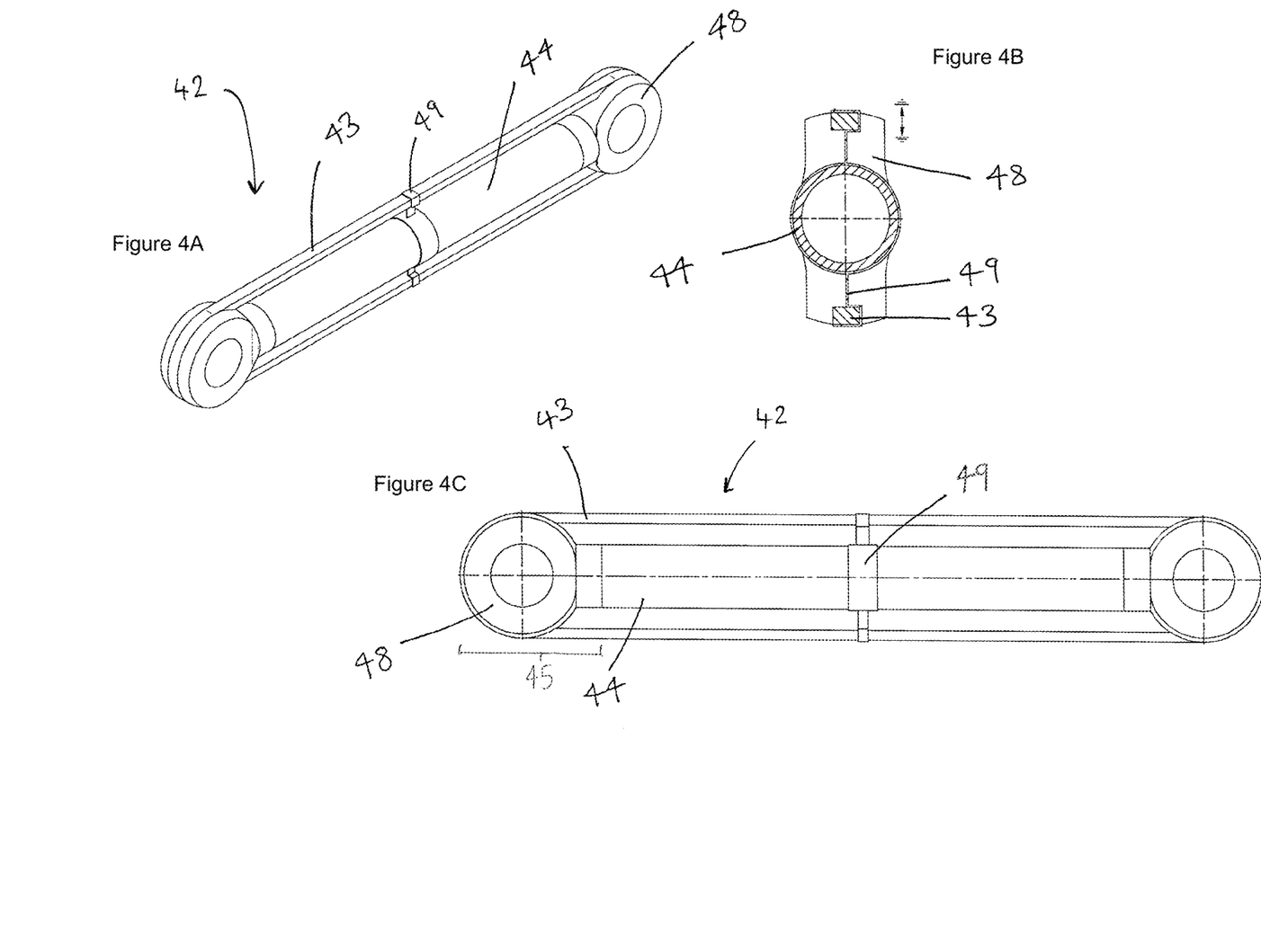
FIGS. 4A-4C show various views of a composite structural component according to a fourth example.

In such an example, one or more stiffening elements 49 may be employed to mitigate vibrations of the tension band, as seen in FIGS. 4A-4C. In this example, a composite structural component 42 is shown that comprises an end thing 48 and an elongate member comprising a compression tube 44 and a tension band 43. The tension band 43 follows the outer surface of the end fitting 48 but does not extend from the end portion 45 along the surface of the compression member 44. Such a large portion of the band 43 being unsupported can lead to potentially damaging radial vibrations of the tension band 43, as illustrated by the double head arrow in FIG. 4B. In the example illustrated here the stiffening element 49 comprises an annular component in the form of a clamp-type fitting placed around the compression member 44 and two radially extending arms which are shaped to constrain the radial position of the tension band 43 at a point approximately halfway along the composite structure.

Figures 3A, 3B, 3C, 3D:
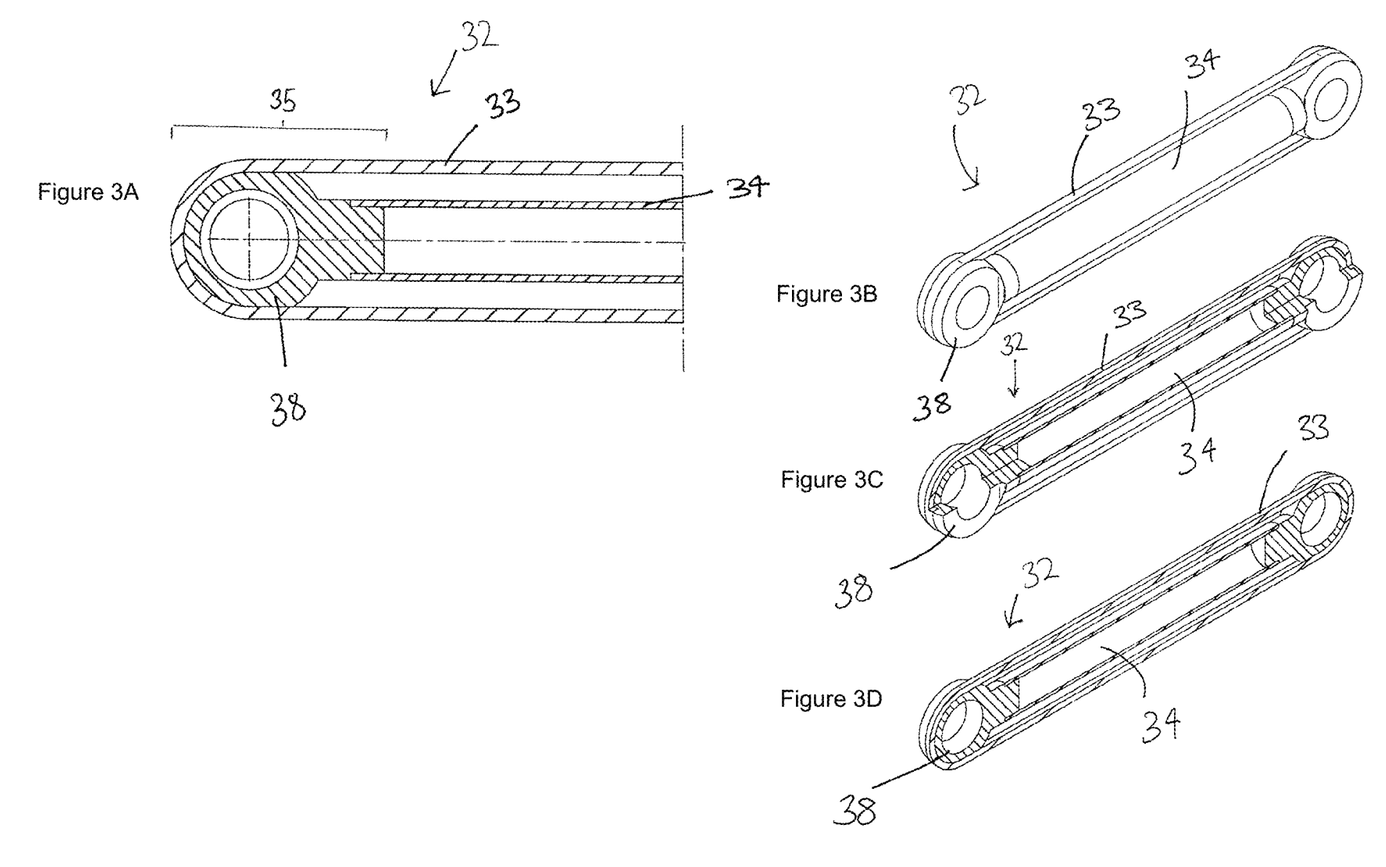
FIGS. 3A-3D show various views of a composite structural component according to a third example.

In FIGS. 3 and 4 the entire composite structural component 32, 42 can be seen. The same end fitting 38, 48 is provided at both ends of the component 32, 42.

FIGS. 5A-5D illustrate another example of a composite structural component 52. The composite structural component 52 comprises an end fitting 58 and an elongate member, which itself comprises a compression member 54 and a tension band 53.

The end fitting 58 comprises an outer cap 57 and an inner fitment 56. The end fitting 58 may be a metal, e.g. steel, component. The outer cap 57 comprises a hollow cylinder with one open end, and is axially symmetric, whereas the inner fitment 56 comprises a solid cylindrical portion 56A with a longitudinal axis running perpendicular to the longitudinal axis of the compression member 54. The outer cap comprises two sections, a wider section and a narrower section wherein the narrower section has a smaller outer diameter than the wider section. The solid cylindrical portion 56A is attached at one end to a connecting arm 56B, which in turn is connected to the outer cap 57 of the end fitting 58. The other end of the solid cylindrical portion 56A is not connected to anything, such that the cylindrical portion 56A and the connecting arm 56B form a hook. As will be explained below, the hook of the inner fitment 56 allows a tension band 53 to be attached to the end fitting 58. The inner diameter of the outer cap 57 is substantially constant along its length, and may be threaded to allow for connection to other components.

The compression member 54 comprises a hollow, filament wound CFRP cylinder, with an internal diameter that is equal to the outer diameter of the narrower section of the outer cap 57. The compression member 54 is positioned such that the end fitting 58 extends into the end of the compression member 54 with only the wider section of the outer cap 57 extending beyond the compression member 54. This prevents relative movement of the compression member 54 and the end fitting 58 during manufacture and use.

The composite material (e.g. CFRP) tension band 53 lies internal to the compression member 58 and is entirely enclosed by the compression member 54 and the end fitting 58. A portion of the tension band 53 is in contact with the inner fitment 56 of the end fitting 58. The portions of the tension band 53 that are not in contact with the inner fitment 56 run parallel to the longitudinal direction of the compression member 54, and the portion that is in contact follows the cylindrical cross section of the inner fitment 56, such that the tension band 53 is connected to the hook of the inner fitment 56. As a result the end fitting 58 is constrained by the compression member 54 and the tension band 53 and a mechanical joint is formed between the end portion 55 of the elongate member 53, 54 and the end fitting 58.

During manufacture, the compression member 54 is pre-loaded with axial (longitudinal) compressive stress, and the tension band 53 is preloaded with tensile stress. As a result all of the components within the composite structural component 52 are held firmly in contact with one another such that they cannot move relative to one another during use, without the use of any adhesive (although this does not preclude the use of adhesives).

In use, the end fitting 58 delivers an axial load to the end portion 55 of the elongate member 53, 54, wherein a compressive load is resisted by the compression member 54 and a tensile load is resisted by the tension band 53. In this example the tension band 53 has a greater thickness than the wall of the compression member 54, but has a width that is significantly smaller than the circumference of the compression member 54. The thickness, width and stiffness of the tension band 53, and the thickness and stiffness of the compression member 54, can be adapted for each particular application to provide the composite structural component 52 with the tensile and compressive strength required.

In this example the tension band 53 is not in contact with the compression member 54, i.e. they are radially spaced apart, but in other examples the tension band 53 may be in contact with the interior surface of the compression member 54. In examples where the tension band 53 is not in contact with the compression member 54, one or more stiffening elements, although not shown here, may be used to mitigate vibrations of the unsupported tension band 53 (e.g. as described above).

Figure 5A:
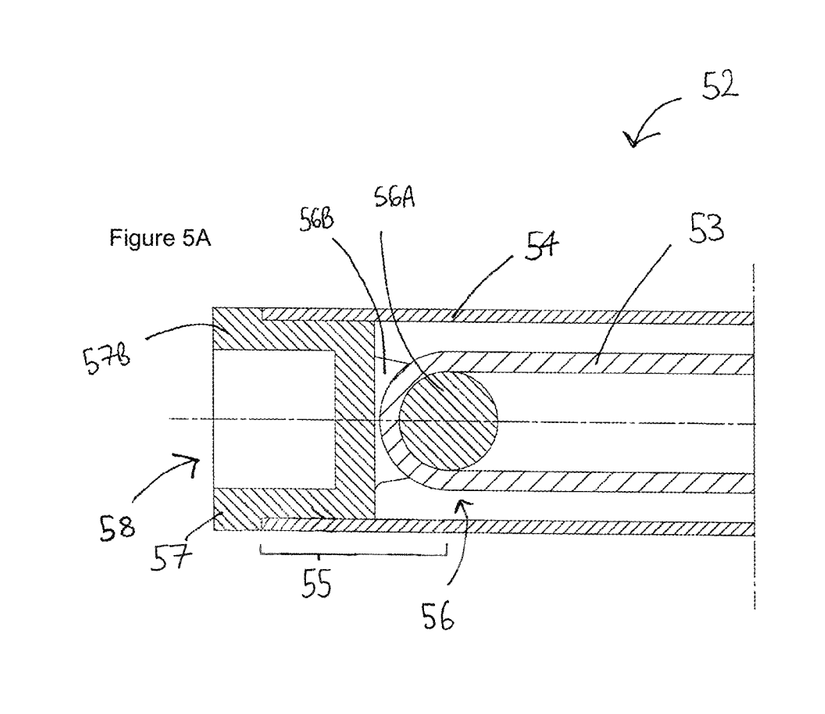
FIGS. 5A-5D show various partial views of a composite structural component according to another example.
Figures 5B, 5C, 5D:
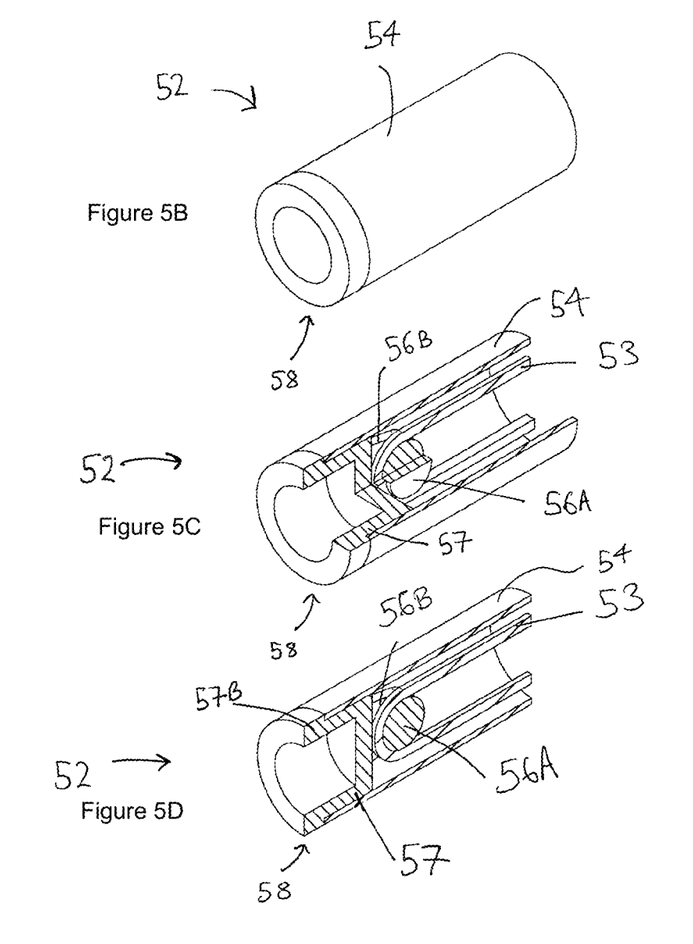

Although FIG. 5 only shows an end portion 55 at one end of the elongate member 53, 54, it will be appreciated that the composite structural component 52 may have the same structure at both ends, with an end fitting at either end or both ends. In particular, the tension band 53 may form a continuous loop extending along the axis of the component 52 and around an end fitting 58 at each end of the component 52.

Although not shown in the Figures, in any of these examples the compression member may be provided with an outer hoop ring at the end forming the mechanical joint. The outer hoop ring, for example a metal ring, may act to resist delamination of the composite material where the end face of the compression member is subjected to compressive loads.

The invention claimed is:

1. A composite structural component comprising:
an elongate member made of a polymer matrix composite material, the elongate member generally extending along an axis of the composite structural component from an end portion thereof; and
an end fitting forming a mechanical joint with the end portion;
wherein the elongate member comprises:
a first member extending from the end portion along the axis of the composite structural component;
a second member extending from the end portion along the axis of the composite structural component, wherein the second member comprises an axisymmetric dome in the end portion; and
wherein the end fitting is constrained in the end portion by the first and second members such that the first member is preloaded with a compressive stress in the axial direction and the second member is preloaded with a tensile stress in the axial direction.

2. A composite structural component according to claim 1, wherein the first member comprises an end face in contact with the end fitting.

3. A composite structural component according to claim 1, wherein the first member is axisymmetric.

4. A composite structural component according to claim 1, wherein the first member is a filament wound structure comprising multiple layers wound at different angles.

5. A composite structural component according to claim 1, wherein the second member comprises a tension band that wraps around the end fitting in a direction that is perpendicular to the axis.

6. A composite structural component according to claim 5, comprising a further end fitting forming a mechanical joint with a second end portion of the elongate member, wherein the tension band forms a continuous loop extending along the axis and around the end fitting and the further end fitting of the composite structural component.

7. A composite structural component according to claim 5, wherein the end fitting comprises a groove in an outer surface that extends in a direction perpendicular to the axial direction and receives the tension band.

8. A composite structural component according to any of claim 5, wherein the tension band is made of a polymer matrix composite material consisting of fibre reinforcement extending at an angle of 0-5° to the axis.

9. A method of forming a mechanical joint for a composite structural component comprising an elongate member made of a polymer matrix composite material, the elongate member generally extending along an axis from an end portion thereof, the method comprising:
providing a first member of the elongate member;
positioning an end fitting in contact with the first member in the end portion of the elongate member so as to preload the first member with a compressive stress in the axial direction;
providing a second member of the elongate member in contact with the end fitting to form a mechanical joint with the end portion, wherein the second member comprises an axisymmetric dome in the end portion;
positioning the end fitting so as to be constrained in the end portion by the first and second members and so as to preload the second member with a tensile stress in the axial direction.

10. A method according to claim 9, wherein providing the first member comprises winding fibres or filaments around a mandrel to form the first member.

11. A method according to claim 9, wherein providing the second member comprises winding fibres or filaments around the end fitting.

12. A method according to claim 9, wherein providing the second member comprises applying a tension band around the end fitting.

\* \* \* \* \*